United States Patent Office 3,511,521
Patented May 12, 1970

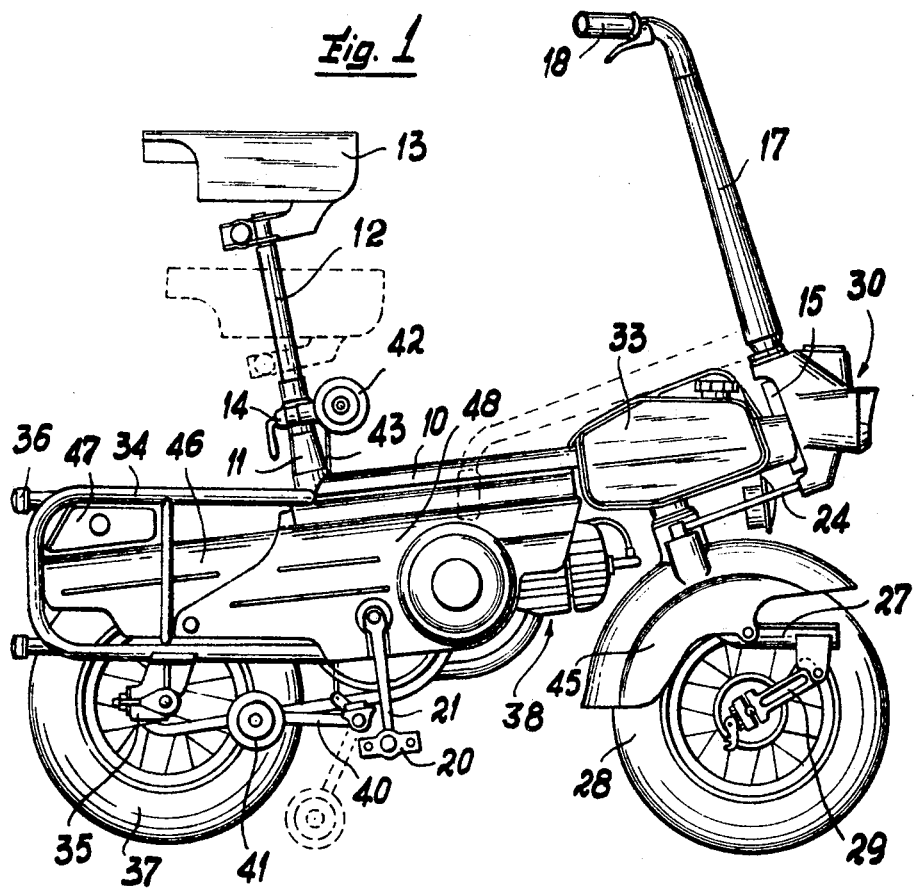
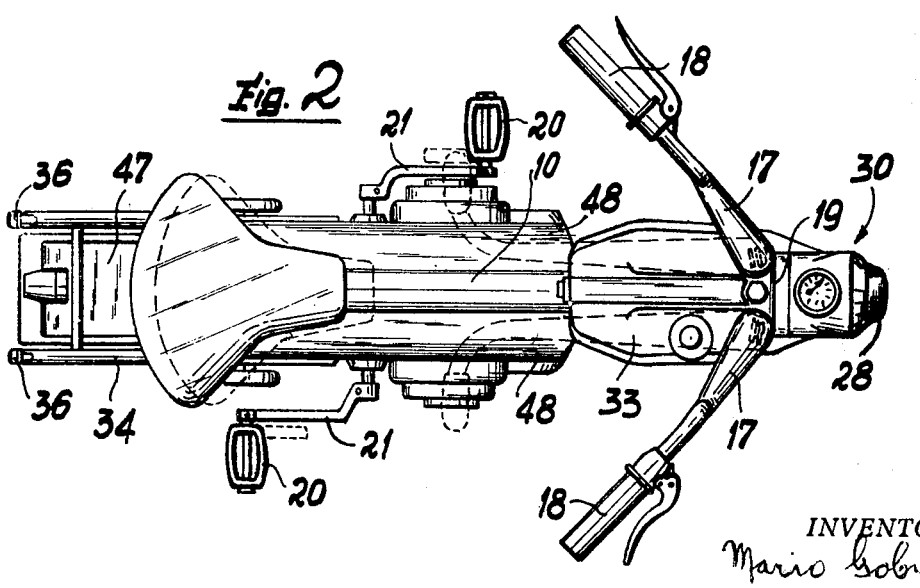

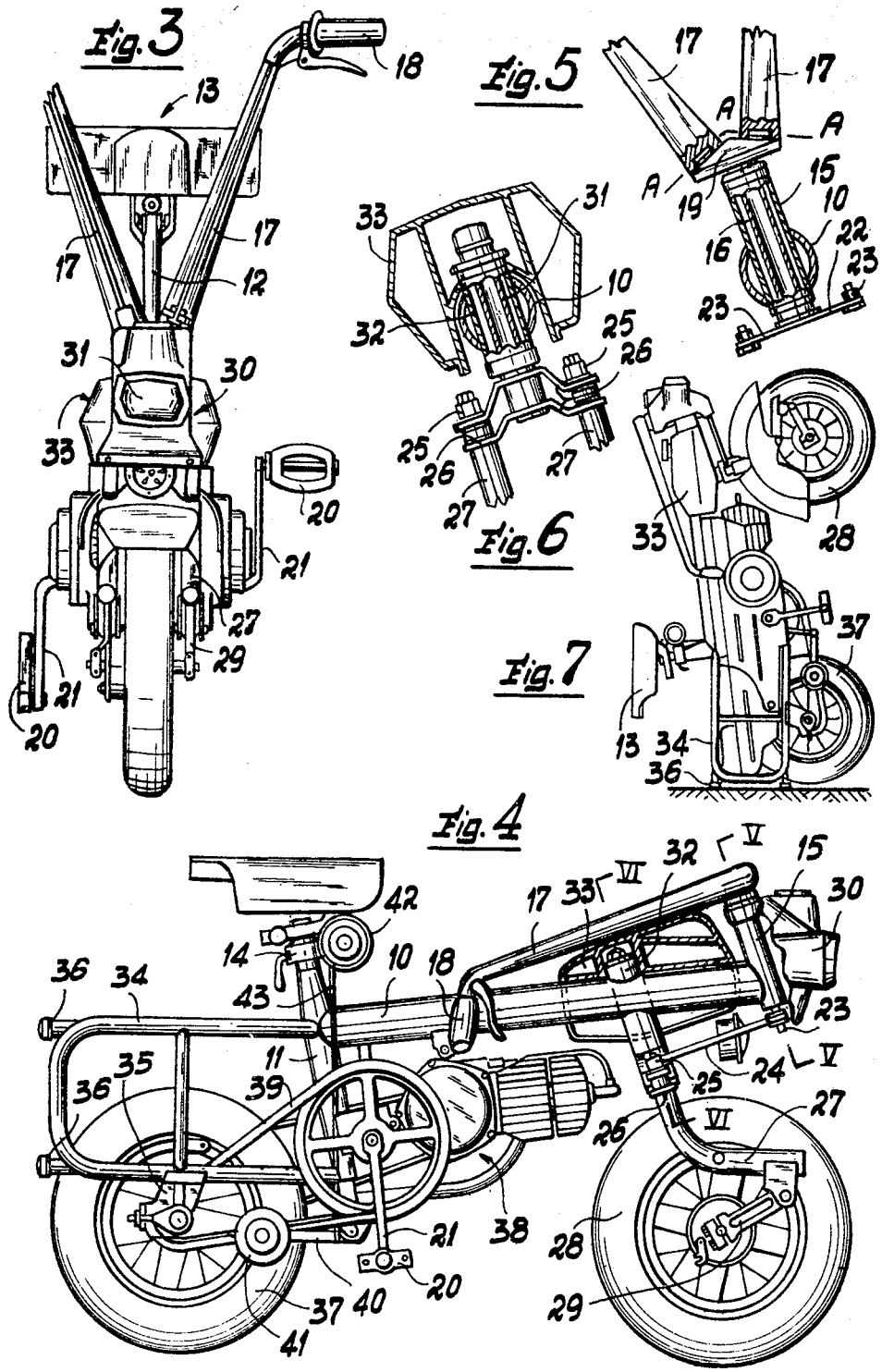

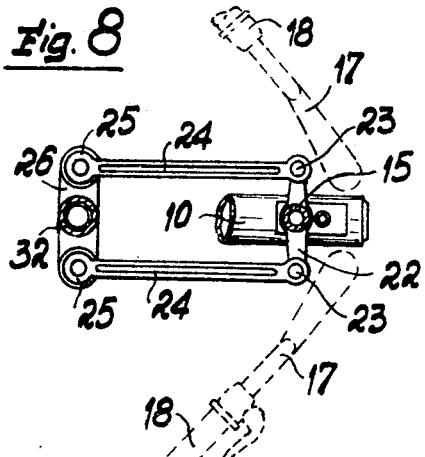
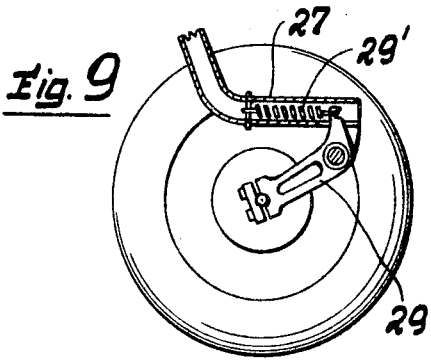
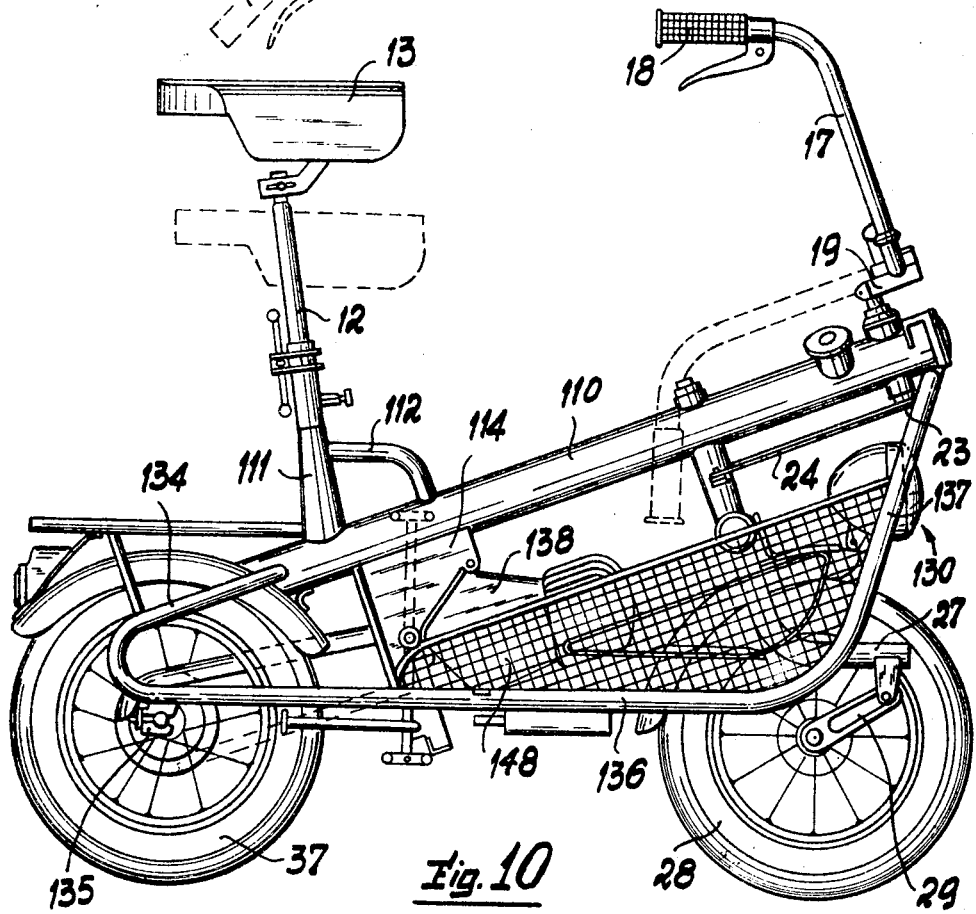

---

3,511,521
COMPACT MOTORCYCLE
Mario Gobini, Milan, Italy, assignor to Teodoro Carneilli & C. S.p.A., Treviso, Italy, a corporate body of Italy
Filed Oct. 2, 1967, Ser. No. 672,147
Claims priority, application Italy, Oct. 7, 1966, 28,662/66; July 14, 1967, 18,399/67
Int. Cl. B62k 15/00
U.S. Cl. 280—270       5 Claims

---

ABSTRACT OF THE DISCLOSURE

A motorcycle of compact construction and adapted for storage and transportation into a baggage compartment of a medium-sized motorcar. The motorcycle has a rigid integral frame supporting at its fore end the steering handlebar, rotatable about an inclined handlebar axis, a front fork supported for rotation about a front fork axis parallel to and rearwardly spaced from said handlebar axis, and link means connecting said handlebar and said front fork for concurrent rotation about the respective axis, the overall length of the motorcycle being less than 120 centimeters.

---

BACKGROUND OF THE INVENTION

This invention is concerned with two-wheeled vehicles and, more particularly, with a motorcycle of compact and simple construction, and adapted for storage and transportation thereof within an exceedingly small space, such as the interior of the baggage compartment of a medium-sized conventional motorcar.

Bicycles and motorcycles of relatively small overall dimensions have been hereto fore proposed and several types of such two-wheeled vehicles have been and are currently produced and widely known. Such vehicles are generally provided with wheels of relatively small diameter, such as of 35 centimeters about and generally have an overall length of not less than 140 centimeters about. Except in the case of particular service, such as use by airborne troops, shorter motorcycles are not considered as feasible and practical, when a reasonable comfort of ride and safe driving are desired. The reason by which a shorter motorcycle is currently considered as not practical can be summarized as follows:

For safe driving namely on uneven road surface at least 30 to 35 percent of total weight of vehicle in operation, that is the weight of the motorcyclist inclusive, is to be loaded on the front wheel. The saddle is therefore positioned well forward of the axis of the rear wheel;

A longitudinal interval between the middlepoint of the saddle and the handlebar hand-grips of at least 40 centimeters is necessary for comfort and safe driving;

The stearable assembly consisting of handlebar, front fork and front wheel is connected to the vehicle frame for rotation about an inclined axis, defined by the axis of the steering head, forming an angle of at least 20 degrees with the vertical; the hand-grips are located rearward and the axis of rotation of the front wheel is located forward of said inclined steering axis. Such conditions lead to a longitudinal interval of at least 35 centimeters between said hand-grips and the axis of the front wheel.

In particular, the relative position of saddle and of handlebar grips, the loading on the front wheel of at least of 30 percent of the total weight of the vehicle in operation, and the inclination of the steering axis of the front fork, together with the relative position of the handlebar grips and of the front wheel rotational axis with respect to the inclined axis about which said components can be rotated for steering, are conditions which must be obeyed too and that are hereby acknowledged as critical for proper, safe and comfortable use of the vehicle.

Therefore, a wheel base (center to center distance between rear and front wheel) of less of one meter about is not currently and soundly accepted. The overall length is defined, at least, by the sum of the wheel base plus the diameter of a wheel, and such sum corresponds to the above value of 140 centimeters about. A vehicle of such overall length cannot be stored into an automobile baggage compartment, for example, and cannot be hand-carried with the desirable ease.

On the other part, such storage and transportation is widely desired in particular by motorists, yachtsmen and other people desirous to dispose of a light vehicle capable for short pleasure or business journeys, even along country lanes and so on.

The problem of providing light pedal and/or motor vehicles which could be stored in shorter space has been also faced heretofore and uniquely solved by the construction of foldable or collapsible vehicles. A number of such foldable cycles and motorcycles is known in the art and currently produced. More complete information about such foldable cycles and motorcycles can be had from the specifications of U.S. Pats. No. 3,294,416 and respectively No. 2,705,156, for example.

Such approach to the above considered problem cannot be however considered as fully satisfying, in particular when motorcycles are concerned with. A composite frame provided with hinged joint means is rather complicated and requires the most careful workmanship and the most desirable structural resistance and safety cannot be ensured. Folding and reassembling or unfolding for use require operation which must be very carefully performed and which, when unproperly or uncompletely done, could result in serious road accidents. A motorcycle structure is unavoidably pretty bulky as its transversal dimension is to be dealt with, and a folded motorcycle, whilst having a small longitudinal dimension, is generally wider than the internal height of a current baggage compartment of a motorcar and therefore cannot be stored and transported thereinto.

Another serious objection to which the said foldable or collapsible motorcycles are subject consists in the fact that the engine, the gears, the fuel tank and all mechanical devices in general must be obviously supported by the rear part of the foldable frame. Such arrangement results in an unfavorable rearward shifting of the center of gravity of the motorcycle structure, and such shifting must be compensated by an incerased longitudinal interval between the rear wheel axis and the saddle.

It is therefore an object of this invention to provide a compact two-wheeled vehicle in particular a motorcycle which is not subject to the above and other objections and limitations. More particularly, it is an object of this invention to provide a compact motorcycle having a not foldable and essentially rigid and integral frame structure, wherein the above indicated conditions of load distribution on the front and rear wheels, of relative positioning of saddle and of handgrips, and of inclination of the steering axis are fully obeyed for comfortable and safe use thereof, and which has an overall length adapted for transportation of the motorcycle into a conventionally and commonly dimensioned baggage compartment of a medium sized automobile. Such overall length can be defined as being of less than 120 centimeters and preferably comprised between 100 and 110 centimeters.

Another object of this invention is to provide a compact motorcycle as above, of simple and fail-safe structure, which can be reduced to small overall dimensions upon performance of very simple and easy operations, such as lowering of its saddle and handlebar components, without effecting its frame structure and its various principal mechanical components. Such overall dimensions can be defined as being of order of 105 by 65 by 35 centimeters about, more or less 10 percent about.

SUMMARY OF THE INVENTION

In accomplishing the above objects of the invention, there is provided, in a two-wheeled vehicle of the character above defined and having a substantially integral frame structure, a steering assembly including handlebar means and supported for rotation about a suitably inclined handlebar axis in a fore steering head integral with the fore end portion of said frame structure, a steered assembly including the front fork and the front wheel, supported for rotation about a front fork axis parallel to and rearwardly spaced from said handlebar axis, and link means for connecting for concurrent rotation said steering assembly and said steered assembly about their respective axes.

These and other objects and characteristic features of this invention will become readily apparent as the description proceeds and will be particularly set forth in the appended claims. The invention itself will be best understood with reference with the accompanying drawings, forming an essential component of this disclosure.

BRIEF DESCRIPTION OF THE DRAWING

FIG. 1 is a side view of a preferred embodiment of the invention, prepared for use;

FIG. 2 is a view from above of the motorcycle of FIG. 1;

FIG. 3 is a fragmentary front view of same;

FIG. 4 is a side view of the motorcycle of FIG. 1, without fairing and mudguard means and prepared for storage and transportation within small space;

FIGS. 5 and 6 are cross-sectional views, taken in the planes indicated at V—V and respectively VI—VI in FIG. 4, and illustrate in rather enlarged scale the essential details of mounting of the steering and respectively of the steered assembly;

FIG. 7 is a somewhat simplified side view of the motorcycle and illustrates how the same can be positioned and supported for facilitating storage and transportation, in certain occurrences;

FIG. 8 is a view from above of link means connecting the said assemblies for concurrent steering rotation;

FIG. 9 is a sectional view of a detail of the front wheel elastic suspension; and FIG. 10 is a side view of a modified embodiment of the invention, comprising a particularly light-weight and simple structure.

DESCRIPTION OF THE PREFERRED EMBODIMENTS

Referring first to the embodiment shown in FIGS. 1 to 4, there is shown a motorcycle having the said overall dimensions.

The compact motorcycle comprises an essentially rigid frame structure including a main longitudinal component consisting of a tubular straight nearly horizontal beam 10 having a nearly vertical tubular post 11 integrally secured to its rear end portion, and wherein a pillar 12 supporting the saddle 13 is telescopingly fitted. A conventionally constructed clamp 14 is provided for securing said pillar and therefore said saddle at the desired height. The general configuration of the motorcycle structure, as shown in FIGS. 1 and 4, is low enough to allow lowering of the saddle, as indicated in FIG. 4, to reduce the overall height of the vehicle within the said desired overall dimensions.

A fore steering head 15 (FIGS. 4 and 5) is welded to or otherwise made integral with the fore end portion of said beam 10. Said fore head 15 defines an axis lying in the vertical longitudinal plane of the motorcycle and inclined, with respect to vertical, at the most proper angle for a correctly positioned motorcycle steering axis. Such angle is in general in the order of 20 degrees. A tubular shaft 16 (FIG. 5) is supported for rotation about said axis within said fore head 15, and forms the pivot for the handlebar assembly. The handlebar is formed by two symmetrical braces 17 each having a grip 18 at its upper end portion. Such braces are shaped and positioned as shown in FIGS. 1 to 3, and connected to a transverse member 19, secured to the upper end of shaft 16, for individual rotation about inclined axes indicated at A—A in FIG. 5, so that said handlebar braces can be rearwardly and inwardly swung from the service position shown by the full lines in FIGS. 1, 2 and 3 to the retreated position shown by the dotted lines in FIGS. 1 and 2. Conventional clamp or blocking means (not shown) are provided for securing the said handlebar components in their service position. Upon lowering of the saddle and of said braces 17, the motorcycle has the configuration generally shown in FIG. 4 (apart from the provision of mudguards and fairings) and its overall height is within 65 centimeters about.

In addition, the motorcycle is provided with a conventional pedal drive (according to current art of very light motorcycles) comprising pedals 20 connected to pedal cranks 21 by means of hinge means, known in the art, adapted for folding such pedals adjacently to the pedal cranks, as shown by the dotted lines in FIG. 2 and by the full lines in the left part of FIG. 3. Such known arrangement, when combined with the above described inward swinging of the handlebar forming braces 17 in the retreated position shown by the dotted lines in FIG. 2, leads to a substantial decreasing of the width of the vehicle too, which can therefore be stored and transported within any space having overall dimensions of 105 by 65 by 35 centimeters about, that is a space such as available within a current motorcar baggage compartment.

Whilst the above overall height and width can be obtained by applying current art in the light motorcycle construction, an overall length less than 120 centimeters has been heretofore believed to be possibly ensured by providing the motorcar with a collapsible or folding frame structure. As above briefly discussed, such unusually short construction of a motorcycle having an essentially rigid frame structure, has been made possible by rearwardly shifting the steering axis of the front fork in respect to the steering axis of the handlebar.

Therefore, instead of conventionally connecting the front fork to the lower end portion of the handlebar shaft (such as shaft 16, FIG. 5), the front fork, comprising two symmetrical curved braces 27, for example, rigidly connected to each other by cross members 26 (FIGS. 4, 6 and 8), is secured to the lower end portion of a shaft 31 supported for rotation within a tubular component 32, forming an integral part of frame 10, about an axis parallel to and rearwardly spaced from the axis of the said shaft 16 of the handlebar. Therefore, there are formed a handlebar or steering assembly, whose shaft 16 is located at the very fore end of the frame, and a front fork or steered assembly, whose shaft 31 is rearwardly spaced from the formed shaft, the spacing being advantageously such to position the front wheel 28, conventionally supported for rotation between the components 27 of said front fork, substantially beneath the said frame 10.

Upon the provision of conventional small diameter wheels, such as of 35 centimeters diameter about, an unusually short motorcycle having a wheel base of 70 centimeters about can be provided, such motorcycle having properly positioned saddle and handlebar means for comfortable and safe drive and for proper load on front and rear wheel, and a front fork steerably supported for rotation about a properly inclined axis.

The said handlebar and front fork assemblies are mechanically interconnected for concurrent rotation, for steering purpose, preferably by means of a link-and-crank mechanism, such as shown in particular in FIG. 8. The lower end portion of the handlebar shaft 16 is secured to a crosspiece 22 to the outer end portions of which are hingedly connected the fore ends 23 of symmetrically positioned links or connecting rods 24, whose rear ends 25 are hingedly connected to the outer end portions of the cross members 26 of the front fork. The steering motions imparted to the handlebar are therefore transmitted to the front fork.

It has been found that such arrangement of parts does not effect the proper and safe steering and motorcycle ride. In the embodiment shown, the said connecting rods 24, as shown in FIG. 8, are parallel to each other, and therefore the amplitude of the transmitted motion is not modified. Such condition has been proved as being fully satisfying in the general service of the vehicle. Such rods could however be made forwardly converging, that is the crank arms formed by the crosspiece 22 could be shorter than the crank arms formed by the cross members 26, and therefore the motion performed by the front fork will be of lesser amplitude than the motion imparted to the handlebar. Such modified construction (not shown but readily conceivable by those skilled in the art) could be desired by someone in consideration of the fact that a such short wheel based motorcycle is very sensitive to steering and will perform short radius curves upon a small steering action.

The motorcycle is provided with conventional means and devices for proper drive and service thereof. Thus, for example, the front wheel 28 is connected to the braces 27 of the front fork by an elastic suspension comprising, for example, pivotable levers 29 and spring means 29' (FIG. 9) located within said fork braces 27. A shaped assembly, generally indicated at 30, and including the motorcycle headlamp, a tachometer or the like, is supported by the upper and lower parts of the handlebar shaft for rotation therewith, and a suitable fuel tank 33 is saddled over about the fore portion of the frame component 10. Likewise, the engine 38 is supported below said frame component, well forward, so that the center of gravity of the vehicle is advantageously forwardly positioned.

The rear wheel 37, drivedly connected to the motor 38 and to the pedal cranks 21 by means of conventionally constructed and arranged means, comprising at least a transmission chain 39, is supported for rotation within a rear fork structure 34, preferably shaped as shown in FIG. 4, the upper part of which forms a parcel grid and the lower part has rear wheel axle supporting means 35 secured thereto. The rear part of said structure 34 has projections 36 secured thereto and advantageously forming support means adapted for vertically supporting and positioning the motorcycle as shown in FIG. 7. Such positioning, the compact and lightweight structure of the motorcycle being taken into account, is very useful for example for storing the vehicle in a corner of a room, for parking the same in a very little space and for transporting the same into a lift or elevator.

The motorcycle is further provided with a stand 40 preferably provided with small wheels 41 and operated by a knob 42, connected to the stand by a stem 43, by the motorcylist seated on the saddle 13, with front and rear mudguards 45 and 46, with a tool box 47 (FIGS. 1 and 2) and with a proper fairing 48 adapted to protect the motor and transmission components. Such parts will not be detailedly described as constructed according to current art, when individually considered.

The modified embodiment of FIG. 10 is particularly adapted for relatively economical but lightweight and sturdy construction of a compact motorcycle capable to resist to most severe abuse, such as careless loading, unloading and handling, cross-country drive and so on. Its frame comprises a rearwardly and downwardly inclined main tubular component 110 having its fore portion above the front wheel 28 (the parts corresponding to those described with reference to FIGS. 1 to 9 have been indicated by the same reference numerals) connected to the described handlebar steering assembly and front fork steered assembly. Such component 110 forms the fuel tank also.

A tubular post 111 is secured to the rear end position of said component 110 and carried the saddle 13, as described above. A curved member 112 is connected to said parts 110 and 111 at the angle formed therebetween for strengthening the connection and to form a suitable handle for carrying the motorcycle. Two symmetrical tubular frame components, having each a rear inclined part 134, a lower nearly horizontal part 136 and a fore upwardly inclined part 137 form the rear fork to which the rear wheel bearing pieces 135 are secured and an effective guard for engine 138, supported by plates 114 below the tubular component 110, and for the front steerable assembly. The engine 138 is laterally protected by wire nets 148, for example, ensuring full cooling air passage. The headlamp 130 can be secured to the front mudguard, for example. The said frame components 134–137, welded to the end portions of tube 110, actuate therewith a rather elastic but very stress-resisting frame structure.

It will be understood that each of the elements described above, or two or more together, may also find a useful application in other types of compact motorcycle differing from the types described above.

While the invention has been illustrated and described as embodied in a compact motorcycle it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspect of this invention.

What is claimed as new and desired to be protected by Letters Patent is set forth in the appended claims:

1. A compact two-wheeled vehicle comprising, in combination, an elongated substantially rigid frame having a longitudinal plane of symmetry and a rear fork portion; a steering head integral with a foremost portion of said frame; a first shaft mounted in said steering head turnable about a steering axis; a cross piece fixed to the upper end of said first shaft; handlebar means connected to said first shaft for turning the latter about said steering axis and comprising two braces arranged symmetrically with respect to said plane of symmetry, each of said braces having a grip at one of its ends and being hingedly connected at the other end thereof to said cross piece tiltable about an axis extending transverse and downwardly inclined to said plane of symmetry; a second shaft mounted on said frame turnable about a second axis parallel to said steering axis and rearwardly located therefrom; a front fork secured to said second shaft for turning therewith about said second axis; a pair of wheels respectively turnably mounted in said rear fork portion and said front fork; and linkage means arranged to opposite sides and symmetrically with respect to said plane of symmetry and connecting said first shaft and said front fork for simultaneous rotation about said first and said second axis, respectively.

2. A compact two-wheeled vehicle comprising, in combination, an elongated substantially rigid frame having a longitudinal plane of symmetry and including a rear fork portion and a luggage support structure about said rear fork portion, said structure having a rearward extension positioned to define support means for said vehicle upon vertical positioning thereof; a steering head integral with a foremost portion of said frame; a first shaft mounted in said steering head turnable about a steering axis; handlebar means connected to said first shaft for turning the latter about said steering axis; a second shaft mounted on said frame turnable about a second axis parallel to said steering axis and rearwardly located therefrom; a front fork secured to said second shaft for turning therewith about said second axis; a pair of wheels respectively turnably mounted in said rear fork portion and said front fork; and linkage means arranged to opposite sides and symmetrically with respect to said plane of symmetry and connecting said first shaft and said front fork for simultaneous rotation about said first and said second axis, respectively.

3. A compact two-wheeled motorcycle comprising, in combination, an elongated substantially rigid frame having a rear fork portion; a steering head integral with a foremost portion of said frame; a first shaft mounted in said steering head turnable about a steering axis; handle bar means connected to said first shaft for turning the latter about said steering axis, said handle bar means being rearwardly tiltable from a working position in which they extend substantially in direction of said steering axis to a folded position adjacent to the upper face of said frame; a second shaft mounted on said frame turnable about a second axis parallel to and rearwardly from said steering axis; a front fork secured to said second shaft for turning therewith about said second axis; a pair of wheels respectively mounted in said front fork and said rear fork portion; and linkage means connecting said first shaft and said front fork for simultaneous rotation about said steering and said second axis, respectively.

4. A vehicle as defined in claim 3, wherein said wheels of said motorcycle have a diameter of about 35 cm. and wherein said motorcycle has a wheel base of about 70 cm. and an overall length of about 110 cm.

5. A compact two-wheeled motorcycle comprising, in combination, an elongated substantially rigid frame having a rear fork portion; a steering head integral with a foremost portion of said frame; a first shaft mounted in said steering head turnable about an upwardly and rearwardly inclined steering axis; a second shaft mounted on said frame turnable about a second axis parallel to and rearwardly from said steering axis; a front fork secured to said second shaft for turning therewith about said second axis; a pair of wheels of substantially equal diameter respectively mounted in said front fork and said rear fork portion; handle bar means extending substantially in direction of said steering axis and connected to said first shaft for turning the latter about said steering axis, said handle bar means having lower ends located substantially above the axis of the front wheel and upper ends located substantially above the upper end of said second shaft; and linkage means connecting said first shaft and said front fork for simultaneous rotation about said steering and said second axis, respectively.

References Cited

UNITED STATES PATENTS

| | | | |
|---|---|---|---|
| 2,525,877 | 10/1950 | Dolphin | 280—278 |
| 2,913,255 | 11/1959 | Courtney et al. | 280—92 X |
| 3,280,932 | 10/1966 | Moulton | 180—33 X |
| 3,294,416 | 12/1966 | Carnielli | 280—278 |
| 3,362,725 | 1/1968 | Dolphin | 280—287 |
| 252,329 | 1/1882 | Richard et al. | 280—270 |

FOREIGN PATENTS 729,782   5/1955   Great Britain.

KENNETH H. BETTS, Primary Examiner

U.S. Cl. X.R.

74—551.3; 280—277, 278, 293